United States Patent Office 3,093,481
Patented June 11, 1963

3,093,481
PLASTIC GLYCERIDE FAT AND PROCESS
FOR PREPARING IT
Eddy W. Eckey, Wyoming, and Richard O. Alderson, Warren County, Ohio, assignors, by direct and mesne assignments, to The Procter & Gamble Company, Cincinnati, Ohio, a corporation of Ohio
No Drawing. Filed Apr. 18, 1961, Ser. No. 103,701
13 Claims. (Cl. 99—118)

This invention relates to improvements in plastic glyceride fats and in methods for preparing them, whereby superior qualities are conferred upon these products, and the range of fat compositions suitable for making them is broadened.

One of the problems encountered with commercially available plastic glyceride fat shortenings is the deterioration of the product during extended periods of storage, particularly when the product is raised to high temperature during the storage period. Many such products acquire a yellowish color instead of the white color usually associated with the shortening. The consistency frequently becomes firmer, and the texture changes from smooth to grainy. Other commercial shortenings become soupy in consistency as they acquire a grainy texture.

It has now been discovered that if small amounts of certain carbohydrate esters are dissolved in the glyceride fat used for making shortening, prior to the quick-chilling operation in the plasticizing process, the finished tempered product will have a softer, more stable consistency, better whiteness and texture, better creaming properties, and greater resistance to loss of these quantities during aging, than the same product would have without the addition of the improving substance. Along with these improved qualities, and presumably in part accounting for the improvements, it has been observed that the solid portion of the plastic glyceride fat exists in the form of smaller, more rounded, and more numerous crystals when the improver has been used than when it is absent, and that the gas phase likewise is more finely dispersed in bubbles of smaller and more uniform size.

Accordingly, it is an object of this invention to provide an improved shortening which has superior keeping qualities, particularly when exposed to elevated temperatures for extended periods of time.

It is a further object to provide a method for improving the texture and consistency of plastic glyceride fats.

Other objects and advantageous features will be apparent from the following detailed description.

In general, the product of this invention comprises a plastic glyceride fat containing from about 0.01% to 0.5%, by weight, of substantially non-emulsifying and non-surface-active fatty acid ester of carbohydrate selected from the group consisting of oligosaccharides and dextrin, at least one-half of the hydroxyl groups of said carbohydrate being esterified with saturated fatty acid having from 14 to 22 carbon atoms.

The advantages of this invention can be realized by the addition of the carbohydrate ester to any of the well-known plastic glyceride fats such as are used in shortening. For example, the fat can comprise vegetable oil hydrogenated to provide desired keeping quality and plasticity. Suitable fats can also include various blends of hydrogenated and unhydrogenated vegetable and animal fats which have suitable keeping qualities and are selected to provide the desired plastic range. Plastic fats can also be prepared by interesterification of one or more animal or vegetable fats and oils to provide desired properties. A part or all of the fat can be glycerides in which one or more of the hydroxyl groups of the glycerine is esterified with a short-chain fatty acid instead of long-chain fatty acids. A more complete description of various types of fats commonly used in the manufacture of shortenings can be found in "Industrial Oil and Fat Products," A. E. Bailey, 2nd Edition, pages 234 to 257 and 755 to 758.

The fats can also contain other well-known additives to provide additional desirable properties. For example, fats used as shortenings for cake baking can contain mono- and/or diglycerides of fatty acids. Other suitable emulsifiers can be present, including esters combining fatty acids, glycerine, and hydroxycarboxylic acids, such as lactic acid.

The shortenings can also contain suitable antioxidants such as butylated hydroxyanisol, butylated hydroxytoluene, citric acid, propyl gallate, and methyl silicone.

Another plastic glyceride fat composition within the scope of the invention is peanut butter which contains peanut protein material in addition to glyceride fats. In addition to components naturally present in peanuts, the peanut butter can also contain partially or substantially completely saturated glyceride fats or combinations of fats and oils added to provide the proper plasticity. Minor amounts of sugar, salt, honey and other additives can also be present.

As can be seen by the foregoing, a wide variety of plastic glyceride fat compositions can be used in the practice of the invention, and it is not to be limited to any particular combinations of fats.

The carbohydrate esters which are added to the plastic glyceride fat composition comprise substantially non-surface-active, non-emulsifying esters of long-chain fatty acids with carbohydrates. The preferred group of carbohydrates is the oligosaccharides which are polymers of monosaccharides and contain from 2 to 10 monosaccharide units per molecule. Examples of suitable oligosaccharides comprise sucrose, lactose, maltose, and raffinose. Dextrin, a higher molecular weight polymer, is also an excellent carbohydrate for use in this invention. Unmodified natural polysaccharides, such as starch, are unsuitable.

The carbohydrate should be esterified with long-chain saturated fatty acids to a sufficient degree to make the ester soluble in hot fat, an average of at least half of the hydroxyl groups of the carbohydrate should be esterified with long-chain saturated fatty acids having from 14 to 22 carbon atoms.

The carbohydrates can additionally be esterified with one or more unsaturated fatty acids having from 14 to 22 carbon atoms, such as myristoleic, palmitoleic, oleic, linoleic, linolenic, gadoleic, arachidonic, erucic, elaidic, clupanodonic, and brassidic acids; short-chain fatty acids containing from 2 to 12 carbon atoms, such as acetic, propionic, butyric, caproic, caprylic, capric, lauric and lauroleic acid; or can have free hydroxyl groups. The esters can contain mixtures of the various types of acids.

A preferred ester is sucrose which has been esterified with an average, per molecule, of at least six molecules of a saturated fatty acid having from 16 to 18 carbon atoms.

The method used for preparing the esters is not critical. Several methods are known and may be used in appropriate circumstances. Among these are the reaction of fatty acid chlorides with carbohydrates in pyridine solution; the alcoholysis of methyl esters of fatty acids by carbohydrates in the presence of alkaline catalyst and a suitable solvent, such as dimethylformamide, and the trans-esterification of acetylated carbohydrates with fatty esters. In some cases, it is more convenient to prepare the ester from acetylated carbohydrate than from the free carbohydrate. In such case, the ester produced may contain a small proportion of acetate groups together with the higher fatty acid groups. Such acetate groups do not interfere with the effectiveness of the ester, and such mixed esters may be utilized without departing from the scope of this invention.

The effective proportion of such esters to be used in shortening varies over a considerable range. Excellent results can be achieved by a concentration of from 0.01% to 0.5%, by weight. The preferred proportion is in the range from 0.025% to 0.25%. For example, sucrose octastearate at a concentration of 0.01% has a preceptible effect; at 0.05%, it has a marked effect; and at 0.1%, the effect is near the maximum. Quantities as large as 0.5% may be used, but still larger proportions may not produce enough further benefit to justify the cost of using them.

The improved plastic glyceride materials of this invention can be prepared by heating a glyceride fat composition to an elevated temperature, and dissolving the carbohydrate ester therein. The resulting product is then converted to a plastic solid by any suitable means, such as rapidly cooling with simultaneous agitation. Conventional scraped wall chillers or cooling rolls are desirable for this step. After the material has been cooled it may be subjected to further agitation, until crystallization is complete, to prevent the formation of crystal aggregates which may be formed.

Shortenings are conventionally tempered by heating them to a temperature of about 85° F. so that crystals made up of molecules of a number of different glycerides, which differ considerably in melting point, are reformed to give a smaller proportion of crystals, but these crystals are more homogeneous, and such treatment may be advantageously applied to products of this invention. However, it has been found that, in general, plastic glyceride fats of this invention will be much softer if they are tempered by heating them to a temperature of about 100° F. or higher, but below the complete melting point.

The manner in which the invention may be practiced and the improvements produced can be conveniently described in connection with plastic shortenings, and will appear more completely in the following descriptions and examples.

EXAMPLE 1

A leading brand of all-hydrogenated vegetable shortening for household use was purchased in 1-lb. cans at a retail grocery. This shortening was made from soybean and cottonseed oils. The shortening was melted, and three portions were replasticized by quick-chilling under identical conditions. The chilling was accomplished by addition of powdered Dry Ice directly to the melted fat, with rapid stirring in a small mixer of special design. The chilling occurred in about 20 seconds, after which stirring was continued for a total of 5 minutes, whereupon the plasticized material was transferred to glass jars. Two portions contained, respectively, 0.1% and 1.0% of sucrose stearate, dissolved in the melted shortening prior to the plasticizing operation; the third portion, with no addition, served as a control sample for comparison. The sucrose stearate was prepared by transesterification of purified sucrose octa-acetate with crude methyl stearate, made from soybean oil that had been hydrogenated to an iodine value of 6. The fatty acids in the sucrose ester therefore were predominantly stearic acid, together with small proportions of palmitic and oleic or iso-oleic acids. The sucrose ester had a saponification value of 186; hydroxyl value, 33; melting point, 58°–59° C.; calculated average number of higher fatty acid groups per molucule, 6.5; acetate groups, 0.3; free hydroxyl groups 1.2.

The shortenings were stored for a lengthy period in a laboratory in which temperatures in the summer frequently exceeded 95° F. After 39 months, examination of the samples revealed that the control sample had deterioriated during storage; it had lost much of its original whiteness and had a yellowish color; the consistency had become firmer; and the texture had changed from smooth to grainy. The same was true of a sample of the shortening as purchased, stored under the same conditions. The samples containing sucrose stearate, in contrast, were more nearly like fresh shortening in color, consistency, and texture. They were distinctly whiter and softer than the control sample, and at least as soft and workable as freshly purchased shortening of the same brand; the texture was completely smooth, without graininess.

Substitution of esters in which the sucrose is esterified with myristic, palmitic, arachidic, or behenic acids, or mixtures of these in place of part or all of the stearic acid in the ester in the foregoing example yields comparable results. Also, comparable results can be obtained when the carbohydrate is additionally esterified with any unsaturated fatty acid having from 14 to 22 carbon atoms and/or short-chain fatty acid having from 2 to 12 carbon atoms as heretofore described.

Substances found to be ineffective in shortening of the type described, or of so slight an effect at a concentration of 0.2% as to be of no practical interest, include sucrose dipalmitate, sorbitan monolaurate, sorbitan monostearate, sorbitan tristearate, and polyoxyethylene sorbitan monostearate.

EXAMPLE 2

The same kind of shortening described in Example 1 was melted and replasticized in the same manner, except that the total time of stirring in the plasticizing machine was two minutes. Observations on the plasticized samples, tempered for 48 hours at two different temperatures, are summarized in Table 1. Samples tempered at an ordinary tempering condition, 86° F., showed that the presence of sucrose stearate caused the shortening to be softened to a moderate degree, and to be improved markedly in creaming properties. Tempering at a temperature considerably higher than normal, 104° F., caused the shortenings containing sucrose stearate to become very much softer than those tempered in the ordinary way, whereas the consistency of the control sample was little changed.

*Table 1*

| Shortening melted and replasticized | Sucrose stearate (same as used in Ex. 1) percent | Tempered at 86° F. | | | Tempered at 104° F. | | | Whiteness |
|---|---|---|---|---|---|---|---|---|
| | | Consistency at 86° F.[1] | Creaming volume[2] | | Consistency at 86° F. | Creaming volume | | |
| | | | Period I | Period III | | Period I | Period III | |
| No | None | 113 | 108 | 150 | | | | |
| Yes | None | 105 | 132 | 167 | 112 | 178 | 138 | [3] |
| Yes | 0.05 | 118 | 133 | 180 | 176 | 172 | 189 | [3] |
| Yes | 0.10 | 121 | 162 | 195 | 221 | | | [3] |
| Yes | 0.20 | 122 | | | | | | [3] |

[1] Consistency expressed as depth of penetration, in tenths of a mm., of a steel needle, dropped from a fixed height.
[2] Creaming volume expressed as volume in ml. per 100 g. of mix. Test made in "Kitchen Aid" household mixer. Volume after Period I is volume of mixture of 100 parts sugar, 60 parts fat, after 5 minutes of mixing; in Period II, 60 parts of whole egg are added in 5 minutes of further mixing; volume after Period III is volume after 10 minutes further mixing.
[3] Samples containing sucrose stearate were noticeably whiter than the sample without additive. To eliminate a possible effect of variable air content, the samples were deaerated under vacuum at room temperature, together with a sample of the shortening as purchased. After this treatment, the control sample had the same whiteness as the commercially plasticized material; the samples containing sucrose stearate were distinctly whiter.

Numerous other similar tests, with variations in conditions of plasticizing and tempering, showed similar improvements in creaming properties when sucrose stearate was present in concentrations from 0.1 to 0.2%, and showed that tempering at 100° F. causes a much greater softening of the shortening than tempering at 86° F., when sucrose stearate is present.

EXAMPLE 3

A quantity of fat stock sufficient for pilot-plant plasticizing of two batches of shortening was obtained from factory production of a vegetable shortening of a type manufactured for household use. The stock was a mixture of approximately 5% hydrogenated cottonseed oil, having an iodine value less than 8, and 95% of partially hydrogenated vegetable oil, made by hydrogenation, under moderately selective conditions, of a mixture of a major amount of soybean oil and a minor amount of cottonseed oil. To this mixture, a monoglyceride preparation was added in quantity sufficient to give a concentration of 1.8% monoglyceride. Characteristics of the complete mixture were: Iodine value, 77.4; cloud point, 31.7° C.

The melted stock was divided into two batches, in one of which was dissolved sucrose stearate in quantity to give a concentration of 0.1% by weight. The long-chain fatty acids constituting the "stearate" were the mixed fatty acids of soybean oil that had been hydrogenated to an iodine value of less than 3. Characteristics of the sucrose stearate were: Acid value, 0.4; saponification value, 185; hydroxyl value, 22; percent total fatty acid, 88.9; melting point, 58.8° C.

The two batches of shortening were alike plasticized under conditions duplicating on a pilot-plant scale the usual type of factory plasticizing, in which the fat passes continuously through a scraped-wall heat exchanger, in which it is chilled rapidly, then through a mixed commonly referred to as a picker box, and thence through a throttle valve into cans. The plasticized shortenings were tempered for 48 hours at 80° F., after which individual cans of the shortening were aged at various temperatures.

The observations made on these samples, recorded in Table 2, illustrate a characteristic which sometimes has undesirable effects in the marketing of this type of shortening. Aging at temperatures above 80° F. causes a gradual firming, so that it is not uncommon for the shortening to become substantially harder and less easily workable by the time it is used by the consumer than it was when freshly prepared. The data in Table 2 show that a few weeks at summer temperature suffices to make the shortening substantially firmer than is desirable and to cause noticeable deterioration in texture and appearance. The presence of 0.1% of the sucrose stearate in the shortening before plasticizing had a very marked effect in preventing firming of the shortening and adverse changes in texture and appearance. When this shortening was subjected to temperatures around 90° F. or higher, it became softer rather than firmer and the effects of long aging at these temperatures were so far eleminated that even at the end of six months at 90° or 100° F., the shortening still had substantially the same consistency at normal room temperature as it had when freshly made.

Table 2

| With or without 0.1% sucrose stearate | Consistency [1] at 70° F. after indicated aging (penetration, mm./10) | | Texture [2] | | Appearance | | Percent beta phase in crystalline portion [3] | |
|---|---|---|---|---|---|---|---|---|
| | Without | With | Without | With | Without | With | Without | With |
| Aged at 70° F.: | | | | | | | | |
| 1 day | 262 | 289 | 9 | 9 | Very good | Very good | | |
| 1 month | 258 | 270 | 9 | 9 | do | do | Trace | 0 |
| 3 months | 232 | 238 | 9 | 9 | Fairly dull | Fair | 0-10 | 0-10 |
| 6 months | 236 | 230 | 9 | 9 | Good | Good | Trace | Trace |
| Aged at 80° F.: | | | | | | | | |
| 1 day | 256 | 286 | 9 | 9 | Very good | Very good | | |
| 1 month | 228 | 256 | 8 | 9 | do | do | | |
| 3 months | 206 | 240 | 8 | 9 | Fairly dull | Good | | |
| 6 months | 205 | 231 | 9 | 9 | Good | do | | |
| Aged at 90° F.: | | | | | | | | |
| 1 day | 220 | 315 | 8 | 9 | Very good | Very good | | |
| 1 month | 214 | 312 | 8 | 9 | Good | Good | Tr.-10 | 0 |
| 3 months | 192 | 302 | 8 | 9 | Fairly dull | do | 10-20 | Trace |
| 6 months | 186 | 260 | 9 | 9 | Dull | do | 10 | 10 |
| Aged at 100° F.: | | | | | | | | |
| 1 day | 196 | 301 | 7 | 9 | Very good | Very good | | |
| 1 month | 180 | 294 | 7 | 9 | Good | Good | 10-20 | 10 |
| 3 months | 153 | 257 | 7 | 8 | Fairly dull | do | 20-30 | 10 |
| 6 months | 140 | 235 | 3 | 8 | Very poor | Poor | 90 | 20 |

[1] Consistency was determined by the depth of penetration of a conical needle into the shortening after it had been returned to 70° F. following the treatment indicated in the table. Values in Table 2 are not directly comparable with values in Table 1.
[2] Texture was graded on a scale in which 10 represents a perfect score, 9 represents very good texture, 7 to 8 means passable, and anything below 7 is unsalable.
[3] Estimated from measurements of X-ray diffraction patterns.

EXAMPLE 4

A quantity of all-hydrogenated vegetable oil shortening of a type manufactured for use in commercial bakeries was taken from regular factory production and plasticized in pilot-plant equipment under conditions duplicating regular factory-scale processing, in the manner described in Example 3. One portion was plasticized without prior addition of improver and a second portion was processed after the addition of 0.1% sucrose stearate prepared in a manner similar to that described in Example 1. Characteristics of the sucrose stearate were: Saponification value, 180; acid value, 0.0; hydroxyl value, 19; melting point, 59° C. The shortening consisted of a mixture of 7 parts cottonseed oil that had been hydrogenated to an iodine value of 8 and 93 parts of a hydrogenated mixture of about 80% soybean oil and 20% cottonseed oil. No monoglyceride was added. The iodine value of the shortening was 74.

Observations on these shortenings, given in Table 3, showed again that sucrose stearate causes the fresh shortening to be softer than it is without the carbohydrate ester, especially when the temperature for tempering is higher than 85° F., and that the firming of the shortening that occurs during aging at temperatures above 70° F. is prevented by the ester addition.

Other observations on these shortenings show that the ester does not cause a change in polymorphic form of the solids, nor a change in the quantity of solids, to which these effects might be attributed. It does cause a radical change in the size and shape of the crystals constituting the solid portion of the shortening, and presumably this is the reason why it is able to cause the softening, stabilizing, and other effects observed.

Determinations of the proportions of solid in the shortening whose consistencies are given in Table 3 are recorded in Table 4. These show that tempering the shortening at 100° F. causes a reduction in proportion of solid present at 80° and 90° F., but that this occurs whether or not the carbohydrate ester is present. No significant change in the proportion of solid is caused by the presence of the improver. Comparison of Tables 3 and 4 shows that in spite of the reduction in percent solid caused by tempering at 100° F., the shortening without ester fails to become proportionately softer; it tends instead to become firmer, especially on long aging at warm temperatures. Evidently the solid changes its character in some manner, probably by growth and interlacing of crystals, so that greater firmness is produced in relation to the quantity of solid. The shortenings containing sucrose stearate, on the other hand, tend to have a more constant relationship between consistency and proportion of solid. Photographs of the solid portions of the two shortenings, separated from the liquid at 70° F. and examined with an electron microscope at magnifications of 3500× and 9600×, show that the crystals are radically changed in size and shape by the improver, away from long narrow forms to shorter, more rounded particles.

*Table 3*

| With or without 0.1% sucrose stearate, ° F. | Consistency (penetration at indicated temp.) | | | | Consistency after storage for 6 mos. at indicated temp., tempered at 85° F. | |
|---|---|---|---|---|---|---|
| | Tempered at 85° F. | | Tempered at 100° F. | | | |
| | Without | With | Without | With | Without | With |
| 50 | 98 | 102 | 75 | 107 | 86 | 88 |
| 70 | 192 | 218 | 156 | 285 | 196 | 208 |
| 85 | 242 | 307 | 248 | >500 | 218 | 360 |
| 100 | 354 | >500 | 333 | >500 | 287 | >500 |

*Table 4*

| Temperature, ° F. | Standard SCI determination [1] | | SCI after tempering 24 hours at 100° F.[2] | |
|---|---|---|---|---|
| | Without improver | With 0.1% sucrose stearate | Without | With |
| 60 | 21.1 | 21.7 | 22.7 | 22.7 |
| 70 | 18.1 | 18.8 | 18.2 | 18.4 |
| 80 | 17.0 | 17.4 | 14.4 | 14.6 |
| 90 | 13.5 | 14.3 | 11.6 | 11.6 |
| 100 | 9.8 | 10.2 | 9.9 | 9.7 |

[1] Solids content index, determined dilatometrically, as described by Fulton, et al., J. Am. Oil Chemists' Soc. 31, 98–103 (1954). Procedure involves tempering the fat for 30 min. at 80° F., after initial chilling and subsequently again chilling.
[2] Same procedure, modified by holding the fat at 100° F. for 24 hours, after the initial chilling, tempering at 80° F., and subsequent chilling.

EXAMPLE 5

Various esters were compared with sucrose stearate for their effect when used in the shortening described in Example 4, with results as given in Table 5.

EXAMPLE 6

A mixture of 59 parts beef tallow, 36 parts unhydrogenated soybean oil and 5 parts hydrogenated palm oil (I.V., 3) was plasticized as described in Example 4, in two batches, with and without the prior addition of the ester described in Example 4. Examination of the solid portions with the electron microscope showed the same type of difference as described in Example 4, except that in this case the crystals from the control batch, not containing additive, appeared larger, smoother and less interlaced than those of the control sample of Example 4. For this reason, probably, this shortening was softer in relation to its solids content than the one described in Example 4, and accordingly was not as much softened by the incorporation of sucrose stearate. Nevertheless, it was softened to some extent by the sucrose stearate, when tempered at 100° F. Also, it was stabilized with respect to a tendency to become firmer on long storage at 100° F. The consistency of a sample tempered at 85° F., then stored at 100° F., was gradually impaired; the penetration value changed from 440 to 390 in one week, to 268 in one month and to 216 in three months. The corresponding sample with sucrose stearate was softer and more stable; its penetration initially and after one month at 100° F. was over 500, and at the end of three months had fallen only to 399, as compared with 216 for the sample without improver.

EXAMPLE 7

A mixture of 72 parts beef tallow, 26 parts soybean oil, and 2 parts hydrogenated palm oil was plasticized in the manner described in Example 6. This shortening was more susceptible to the firming effect of storage at 100° F. than the shortening described in Example 6, and correspondingly the softening and stabilizing effect of the sucrose stearate of Example 4 was greater in this shortening than that described in Example 6.

Tests with numerous mixtures of all-hydrogenated vegetable oil shortenings with ester of the types described in Examples 6 and 7 all showed large effects on consistency, stability, and creaming properties when sucrose stearate and similar esters were incorporated in the shortenings prior to plasticizing.

EXAMPLE 8

A mixture of 88 parts unhydrogenated soybean oil with 12 parts vegetable oil that had been hydrogenated to an iodine value of 8, was plasticized with and without sucrose stearate as described in Example 4. The added ester produced a noticeable softening of the shortening. The penetrations at 70° F., for example, after the shortenings had been tempered at 85° F., were 204 for the one without additive and 268 for the one containing sucrose stearate; on samples tempered at 100° F., the 70° penetrations, were, respectively, 205 and 315.

EXAMPLE 9

A mixture of 83 parts corn oil and 17 parts hydrogenated palm oil was plasticized as described in Example 1

*Table 5*

| Type of ester | Sucrose stearate | Sucrose palmitate ("hexa") | Sucrose palmitate ("tetra") | Sucrose ester of mixed f.a. | Dextrin palmitate acetate | Blown, heated glyceryl ester [1] |
|---|---|---|---|---|---|---|
| Approximate average number of long-chain fatty acid radicals. | 7 | 6 | 4 | 2 | ([2]) | 4. |
| Principal chain lengths of combined fatty acids. | $C_{18}$ | $C_{16}$ | $C_{16}$ | $C_{18}$ and $C_{16}$ | $C_{16}$ | $C_{16}$ and $C_{18}$. |
| Approx. I.V. of long-chain fatty acids | 7 | 0 | 0 | 75 | | |
| Total fatty acids [3] | 90.0 | 84.2 | 79.4 | 73.8 | | 66.7. |
| Saponification value [3] | 180 | 166 | 183 | | | 339. |
| Hydroxyl value [3] | 19 | 59 | 172 | | | 10.2. |
| Melting point, ° C | 59 | | | | | |
| Effectiveness | Effective | Effective | Slight effect | No effect | Effective | No effect. |

[1] Cottonseed oil, hydrogenated to I.V. of approximately 8, blown with air and heated, to cause oxidation and polymerization.
[2] The dextrin was substantially completely esterfied and contained an average of 2 acetyl and 1 palmitoyl groups per glucose unit.
[3] Determined according to Official and Tentative Methods of the American Oil Chemists' Society.

with and without the prior addition of 0.1% of the sucrose stearate described in Example 3. After tempering at 100° F., the batch containing the additive was about 20% softer than the other batch as determined by penetration measurements, and had substantially better creaming properties. The volumes at the end of Period III in the creaming test, made as described in note 2 of Table 1, were 165 for the batch without additive and 199 for the one containing sucrose stearate.

The properties of the improved shortenings described in the foregoing examples embody several practical benefits which may be taken advantage of in more than one way. An obvious advantage is the improved uniformity of quality at the point of use of the shortenings, due to improved stability with respect to undesirable changes in consistency during aging. Besides this, the manufacturer is enabled, if he so desires, to produce shortening with a softer consistency and correspondingly easier working properties without impairing its appearance and stability toward oxidation. Or, the consistency may be held at levels previously considered ideal, and the benefit taken in terms of improvement in other qualities, or in economies in manufacture. The softening and stabilizing effects give the manufacturer more latitude in the choice of fats and oils used in formulating shortenings, and in the conditions and end-points chosen for hydrogenation.

Shortenings made according to this invention are superior in consistency, working qualities and appearance and are improved in their ability to hold these qualities without deterioration, through the viscissitudes of varying temperature and extended aging that often occur in the time between manufacture of shortenings and their ultimate consumption.

It has been noted that the crystalline material in certain shortenings, such as those made from soybean oil, tends to transform to the beta phase. When this happens the shortenings lose their good appearance and ultimately degenerate to a soupy, grainy condition. It has been noted that the addition to such shortenings of ester covered by this invention will greatly retard this type of change in the shortenings.

Although the foregoing has specifically described the invention in terms of shortenings, it is to be understood that other compositions which contain substantial amounts of glyceride fats will have their properties similarly improved by the addition of the selected carbohydrate esters and are to be included within the scope of this invention.

What is claimed:

1. A plastic glyceride fat composition containing from about 0.01% to 0.5%, by weight, of substantially non-emulsifying and non-surface-active fatty acid ester of carbohydrate selected from the group consisting of oligosaccharides and dextrin, at least one-half of the hydroxyl groups of said carbohydrate being esterified with saturated fatty acid having from 14 to 22 carbon atoms, said carbohydrate having not more than one-half of its hydroxyl groups unesterified, and any additional fatty acid groups of said ester being selected from the group consisting of fatty acids having from 2 to 12 carbon atoms and unsaturated fatty acids having from 14 to 22 carbon atoms.

2. A fat according to claim 1 wherein the carbohydrate is substantially completely esterified with saturated fatty acid having from 14 to 22 carbon atoms.

3. A fat according to claim 1 wherein the carbohydrate is sucrose and has been esterified with an average, per mol, of at least six mols of stearic acid.

4. A fat according to claim 1 wherein the carbohydrate is sucrose octastearate.

5. A fat according to claim 1 wherein the carbohydrate is sucrose octapalmitate.

6. The method of improving the stability of glyceride shortening materials which comprises the steps of melting said glyceride shortening; mixing therewith from about 0.01% to 0.5% by weight, of a non-emulsifying non-surface-active fatty acid ester of carbohydrate selected from the group consisting of oligosaccharides and dextrin, at least one-half of the hydroxyl groups of said carbohydrate being esterified with saturated fatty acid having from 14 to 22 carbon atoms, said carbohydrate having not more than one-half of its hydroxyl groups unesterified, and any additional fatty acid groups of said ester being selected from the group consisting of fatty acids having from 2 to 12 carbon atoms and unsaturated fatty acids having from 14 to 22 carbon atoms; and thereafter converting the mixture to a plastic fat.

7. The method according to claim 6 wherein the mixture is converted to a plastic form by being rapidly cooled with agitation.

8. The method according to claim 7 wherein the cooled mixture is agitated, after being cooled, until crystallization is complete.

9. The method according to claim 6 wherein the plastic fat is tempered by heating to a temperature of at least 100° F. but less than the complete melting point of the fat.

10. The method according to claim 6 wherein the carbohydrate is substantially completely esterified with saturated fatty acids having from 14 to 22 carbon atoms.

11. The method according to claim 6 wherein the carbohydrate is sucrose and has been esterified with an average, per mol, of at least 6 mols of stearic acid.

12. The method according to claim 6 wherein the carbohydrate is sucrose octastearate.

13. The method according to claim 6 wherein the carbohydrate is sucrose octapalmitate.

References Cited in the file of this patent

UNITED STATES PATENTS 2,223,558    Epstein _____ Dec. 3, 1940